USOO5616032A

United States Patent [19]
Keitzer et al.

[11] Patent Number: 5,616,032
[45] Date of Patent: Apr. 1, 1997

[54] MULTIPURPOSE CHECK WRITING GUIDE

[76] Inventors: John E. Keitzer; Betty J. Keitzer, both of 5324 Ingleside, Plantation at Leesburg, Leesburg, Fla. 34748

[21] Appl. No.: 372,379

[22] Filed: Jan. 13, 1995

[51] Int. Cl.⁶ .................................................. G09B 21/00
[52] U.S. Cl. ........................................... 434/117; 434/162
[58] Field of Search ..................................... 434/112, 113, 434/117, 164, 162, 107, 427; 283/45, 57, 58

[56] References Cited

U.S. PATENT DOCUMENTS

| | | | |
|---|---|---|---|
| 71,084 | 11/1867 | Synnott | 434/117 |
| 3,340,625 | 9/1967 | Supitilor . | |
| 3,370,530 | 2/1968 | Henderson . | |
| 3,816,943 | 6/1974 | Henry | 434/117 |
| 4,003,143 | 1/1977 | Keitzer et al. . | |

Primary Examiner—Jeffrey A. Smith
Attorney, Agent, or Firm—Woodard, Emhardt, Naughton Moriarty & McNett

[57] ABSTRACT

A check writing guide for use by people with writing difficulties caused by old age, blindness, stroke, amputation, arthritis, nervous disorders, etc. The guide includes a base plate and a template. The template has a first guide sized and positioned to facilitate writing the date on a check, a second guide sized and positioned to facilitate writing the name of the payee on a check, a third guide sized and positioned to facilitate writing the amount, in numerals, on a check, a fourth guide sized and positioned to facilitate writing the amount, in text, on a check, a fifth guide sized and positioned to facilitate signing the name of the payor on a check, and a sixth guide sized and positioned to facilitate endorsing a check. The check writing guide is also useful when endorsing common brands of travelers checks.

2 Claims, 5 Drawing Sheets

MULTIPURPOSE CHECK WRITING GUIDE

FIELD OF THE INVENTION

The present invention relates generally to check writing guides to aid persons with writing difficulties in writing a check, and more particularly to a check writing guide which is useful when drafting or endorsing personal or travelers checks.

BACKGROUND TO THE INVENTION

The current state of the art check writing guide is described in U.S. Pat. No. 4,003,143 to Keitzer et al., issued Jan. 18, 1977. That guide has an apertured template held in a spaced-apart relation with respect to a solid back panel so that the template will overly a check slipped into the cavity. The apertures in the template identify the locations between those two members where information must be entered to write a check. A second panel, hinged to the first panel acts as a stabilizing rest for the wrist area of the user, and protects the template when the guide is not in use.

As good as the original Keitzer check writing guide is, it does not provide a template for endorsing checks, rather than drafting them. Further, the prior art check writing guide is not particularly effective for drafting or endorsing other negotiable instruments, particularly travelers checks.

A need therefore exists for a check writing guide with improved flexibility with respect to allowing both drafting and endorsement of a personal or travelers check. The present invention addresses this need.

SUMMARY OF THE INVENTION

Briefly describing the present invention there is provided a check writing guide comprising a base plate member and a template member. The template member has a first aperture sized and positioned to facilitate writing the date on a check, a second aperture sized and positioned to facilitate writing the name of the payee on a check, a third aperture sized and positioned to facilitate writing the amount, in numerals, on a check, a fourth aperture sized and positioned to facilitate writing the amount, in text, on a check, a fifth aperture sized and positioned to facilitate signing the name of the payor on a check, and a sixth aperture sized and positioned to facilitate recording information on the memo line or endorsing a check. The check writing guide is also useful when endorsing common brands of travelers checks.

One object of the present invention is to provide an improved check writing guide that is also useful when endorsing personal or travelers checks.

Further objects and advantages of the present invention will be apparent from the following description.

DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the illustrated embodiments, and such further applications of the principles of the invention as illustrated herein being contemplated as would normally occur to one skilled in the art to which the invention pertains.

The present invention relates generally to a multipurpose guide which allows people with writing difficulties such as blindness, low vision, amputees, stroke victims, nervous disorders, arthritics, etc. to be more financially independent by being able to easily write legible checks, endorse, cash or deposit checks. The check writing guide is adaptable for use with both personal and travelers checks, and is equally useful when endorsing those instruments.

Figure 1:
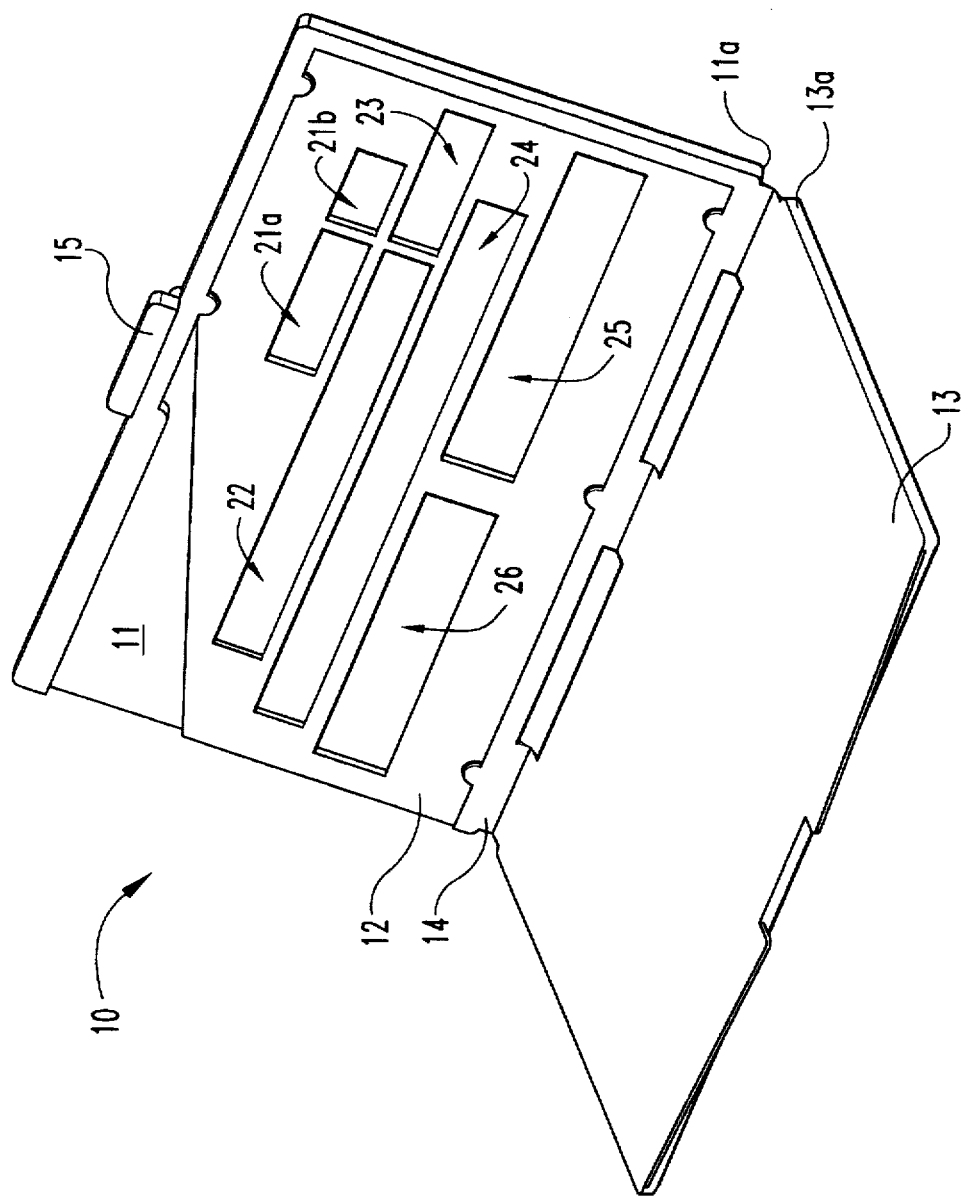
FIG. 1 is a perspective view of the check writing guide of the present invention, according to one preferred embodiment.

Referring to the drawings, FIG. 1 shows the check writing guide of the present invention, according to one preferred embodiment. Check writing guide 10 includes a base plate member 11, a template member 12, and a cover member 13. In preferred embodiments, cover member 13 is hingedly attached to base plate member 11 by hinges 14 along edges 11a and 13a of base plate member 11 and cover member 13, respectively. A cover fastener 15 may also be included Template 12 includes apertures to assist elderly or visually impaired persons in writing and endorsing checks. In particular, a first aperture 21a sized and positioned to facilitate writing the date on a check is provided. Additionally, an aperture 21b to facilitate writing the year of the date may also be provided.

A second aperture 22 sized and positioned to facilitate writing the name of the payee on a check is also preferably provided. This check guides the writer to provide the payee's name on the "pay to the order of" line of a personal check.

A third aperture 23 sized and positioned to facilitate writing the amount, in numerals, on a check is also provided. That aperture is provided to guide a person in filling in the numerical value of the check.

A fourth aperture 24 sized and positioned to facilitate writing the amount, in text, of the check is also provided. Also, a fifth aperture 25 sized and positioned to facilitate signing the name of the payor on the check is included. Finally, a sixth aperture 26 is sized and positioned to facilitate endorsing a personal check. The sixth aperture 26 may also be used when filling out the memo line of a check.

Preferably, all of the above apertures are rectangular in shape so that a person is guided to write the appropriate information in the box-shaped area revealed by the aperture.

Figure 2:
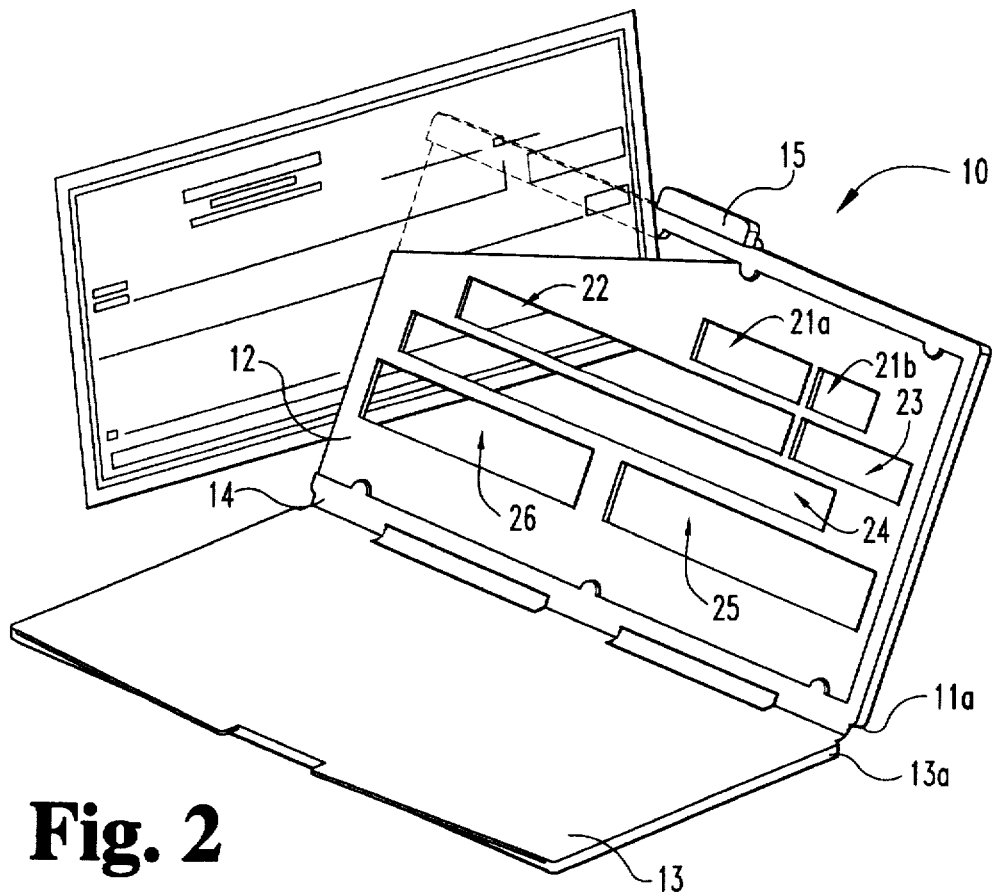
FIG. 2 shows the check writing guide of FIG. 1, with a personal check being inserted therein.

To use the guide, a check is inserted between the base plate member and the template as shown in FIG. 2. The base plate member and a template are spaced apart to allow insertion of a check, but are close enough together so that the check is relatively securely held. This aspect of the multipurpose check writing guide is similar in most respects to the prior ark check writing guide described in U.S. Pat. No. 4,003,143 to Keitzer et al. After the check has been properly inserted it is pushed all the way in so that the apertures are positioned over the data entry locations to which they relate.

Figure 3:
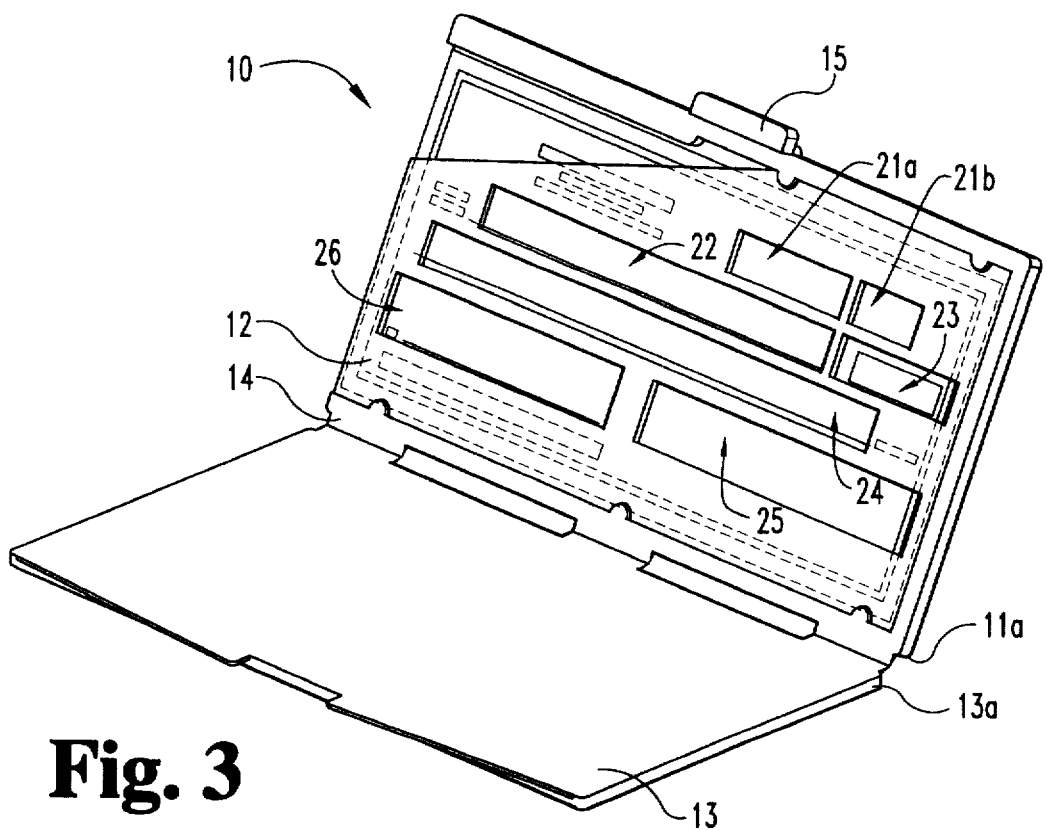
FIG. 3 shows the check writing guide of FIG. 1, with a personal check fully inserted therein.

Once the check has been properly positioned as shown in FIG. 3, the check may be filled out. As indicated, the apertures adapted to guide a person in filling in the date, payee, amount, and payor of the check are positioned as appropriate for standard personal checks, and the writer merely provides the desired information in the appropriate data entry locations. Additionally, aperture 26 may be used to fill in the "memo" line of the check.

Figure 4:
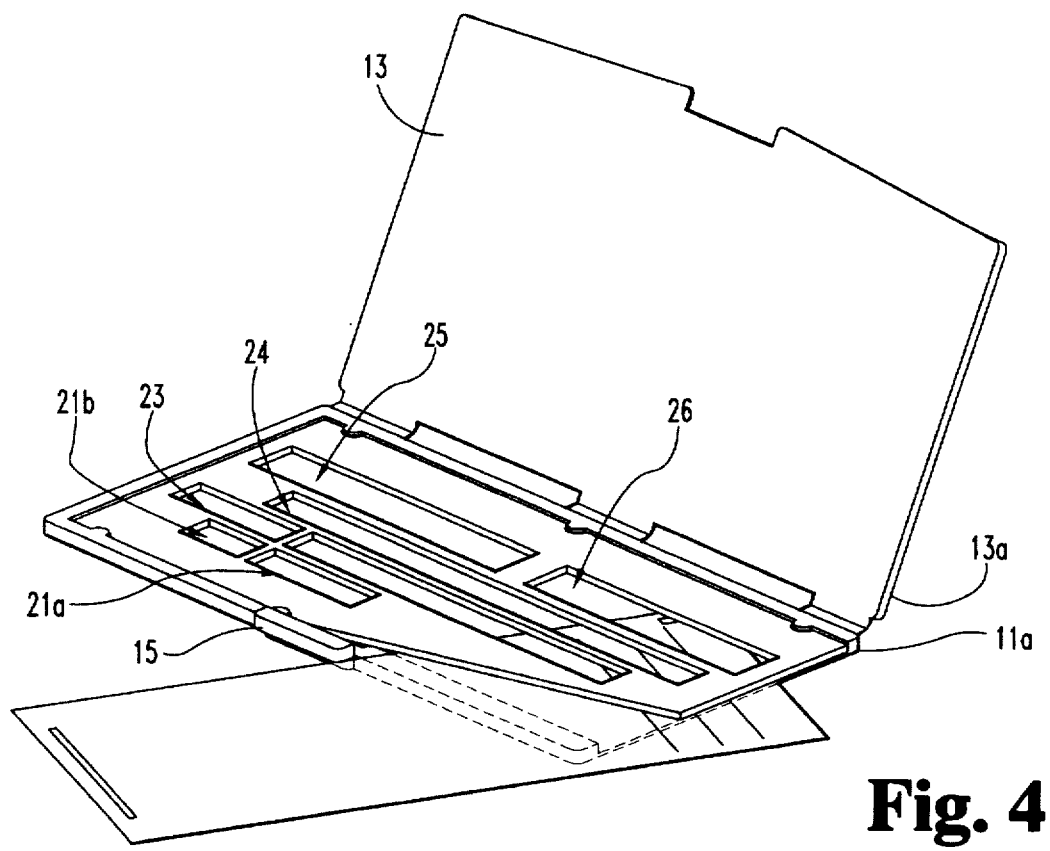
FIG. 4 shows the check writing guide of FIG. 1, with a personal check being positioned to be endorsed.
Figure 5:
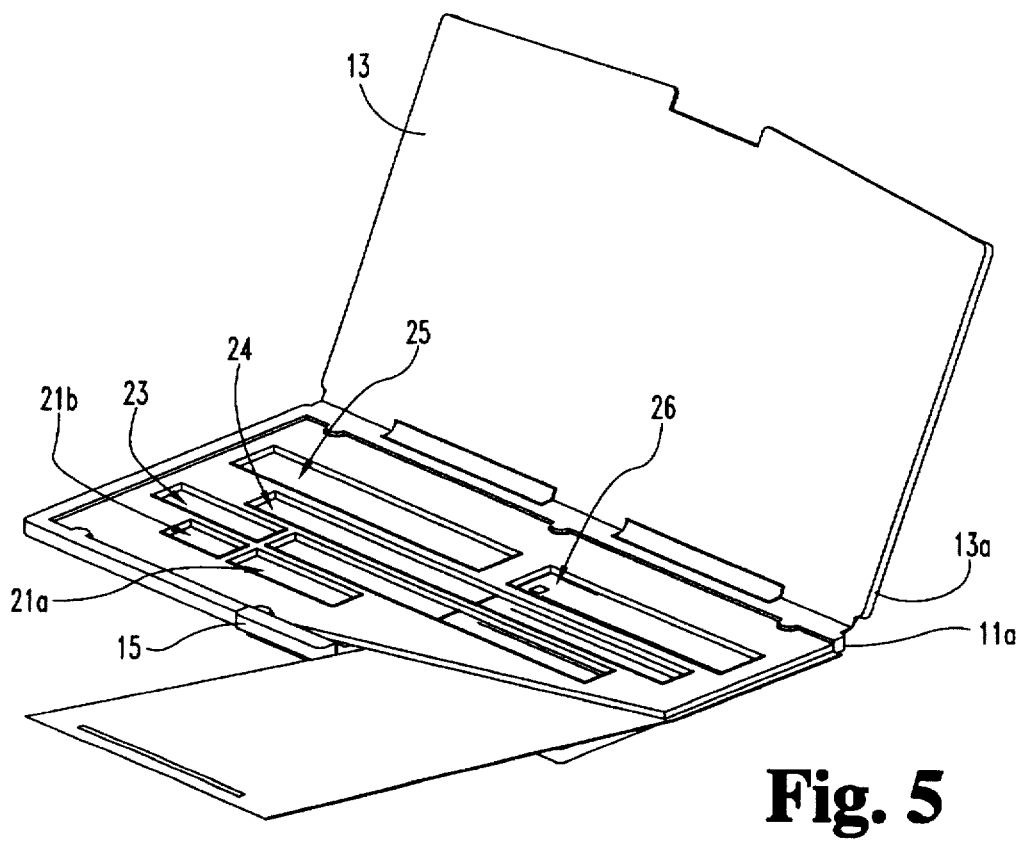
FIG. 5 shows the check writing guide of FIG. 1, with a personal check ready to be endorsed.
Figure 6:
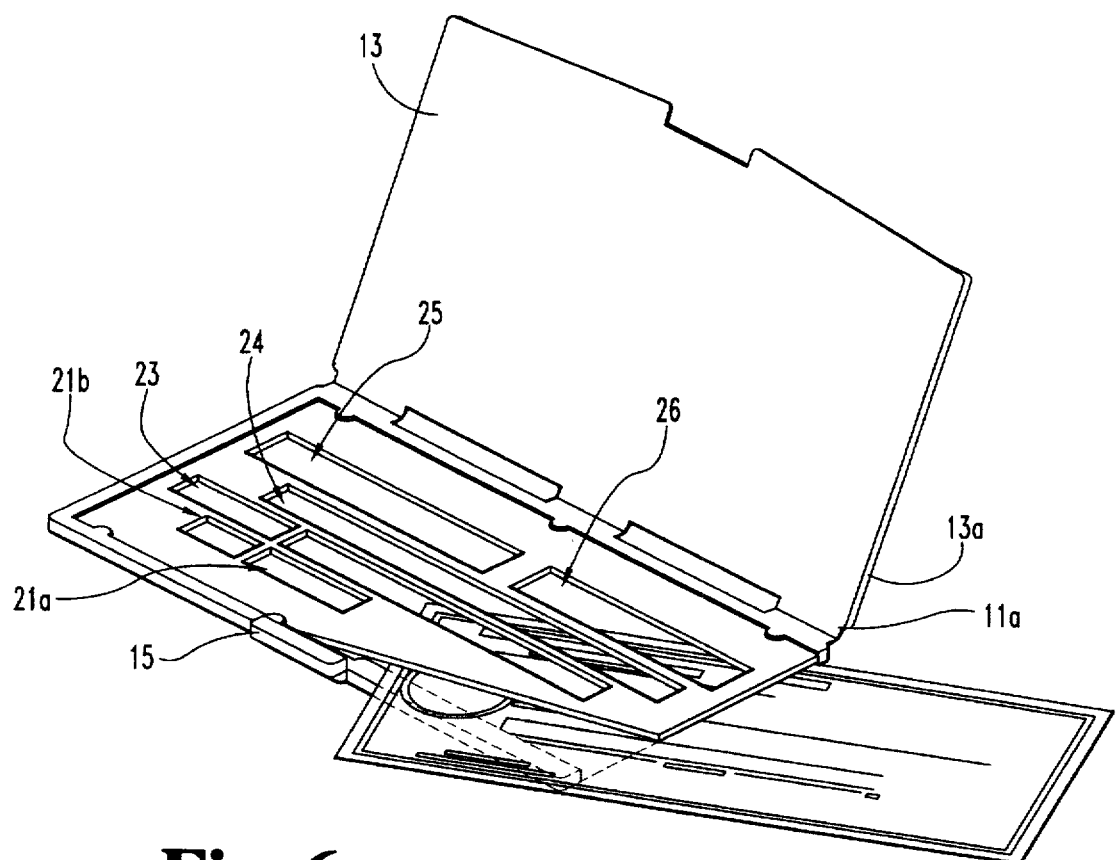
FIG. 6 shows the check writing guide of FIG. 1, with a travelers check being positioned to be purchased.
Figure 7:
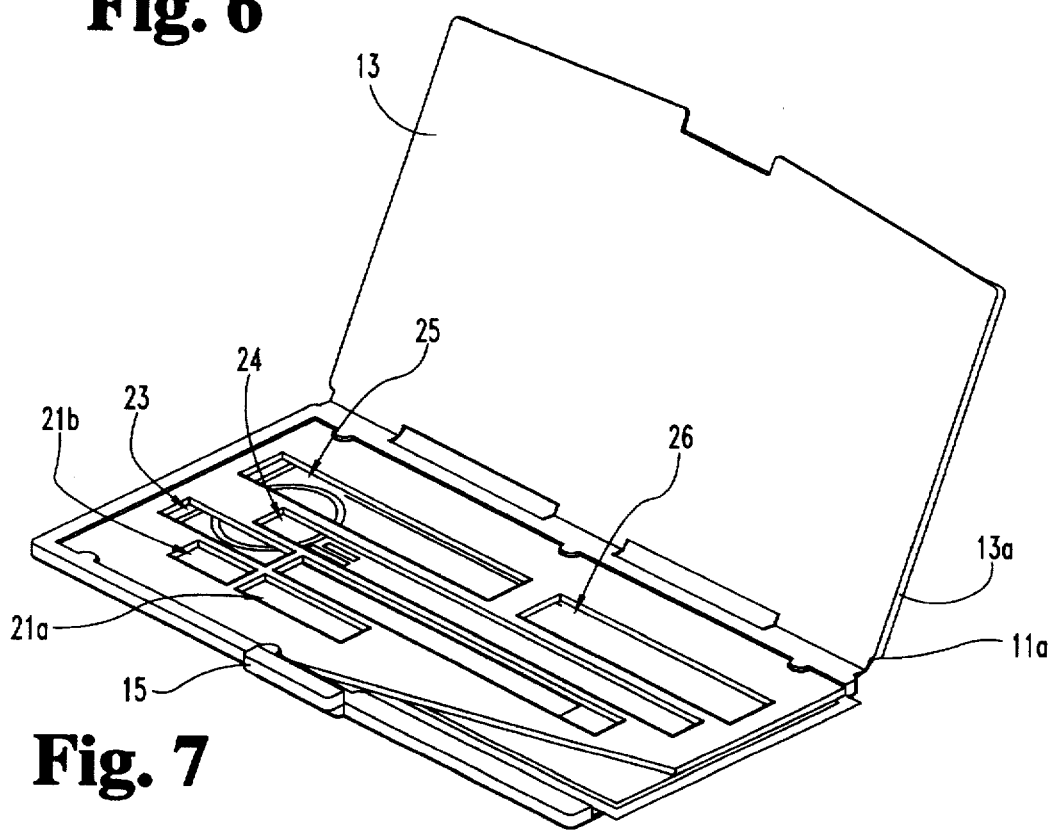
FIG. 7 shows the check writing guide of FIG. 1, with a travelers check ready to be signed at purchase.
Figure 8:
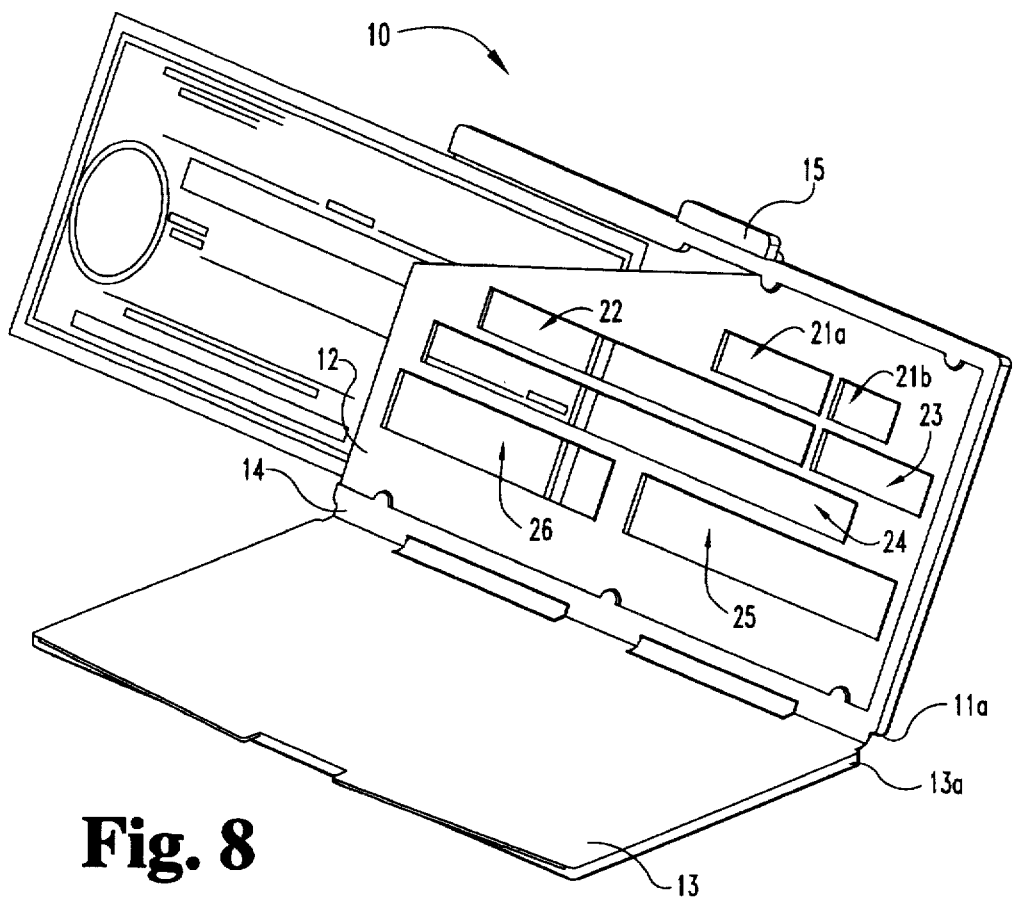
FIG. 8 shows the check writing guide of FIG. 1, with a travelers check being positioned to be endorsed.
Figure 9:
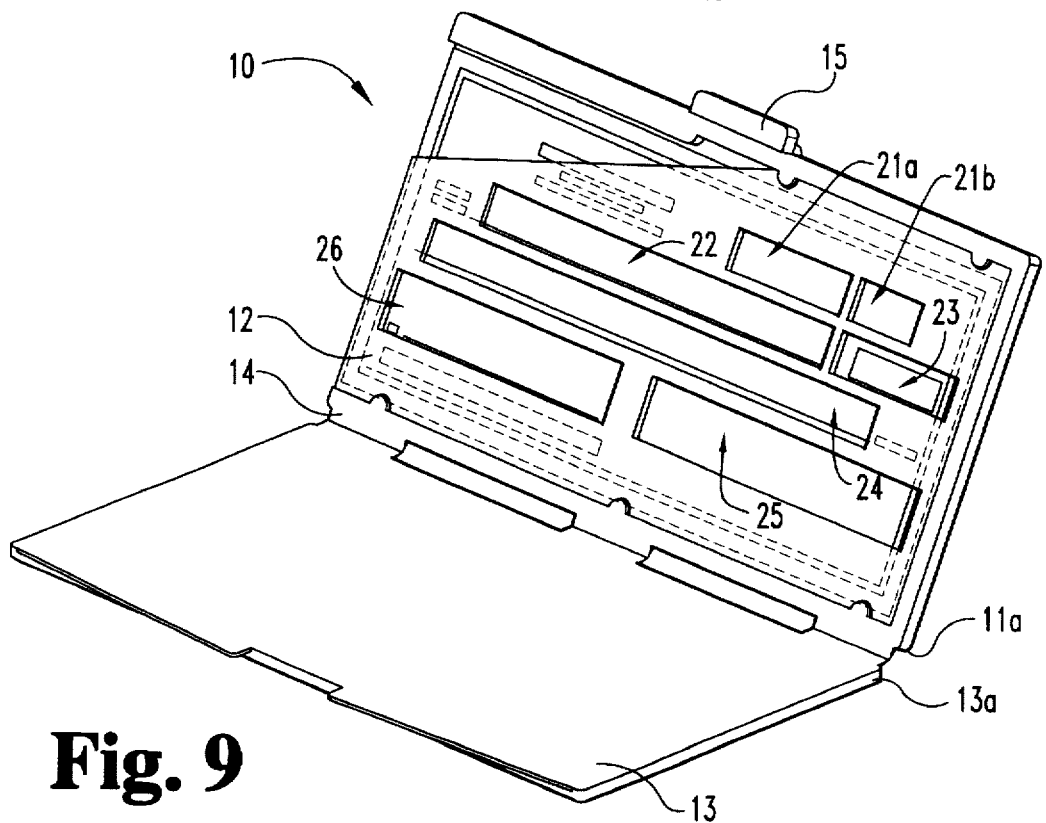
FIG. 9 shows the check writing guide of FIG. 1, with a travelers check ready to be endorsed.

To endorse a personal check, the check is inserted as shown in FIG. 4. With a check so inserted, aperture 26 is positioned so that a person may endorse the check in the location prescribed for that use.

When using travelers checks, the check writing guide may be used "upside down" and the travelers check inserted from right to left. For checks that are initially signed in the upper left hand corner aperture 25 is initially used. For checks that are initially sighted in some other location, the appropriate aperture may be selected and the check signed in that location when purchased.

When cashing a travelers check, the check may be inserted as a personal check, and the check is signed in aperture 26 for checks that require endorsement there. Other types of travelers checks may be signed and endorsed using the multipurpose check writing guide after identifying the appropriate apertures for use therewith.

It is to be appreciated that a cover member is optionally included with the device. Preferably, the cover is hingedly attached to base member 11, most preferably with "living hinges" molded directly in the plastic. Thus, the check writing guide preferably is constructed of a "one piece" hinged base member/cover member, and a template member insertable therein. Most preferably, the template member snaps into the base member and is replaceable if different apertures are desired.

While the invention has been illustrated and described in detail in the drawing and foregoing description, the same is to be considered as illustrative and not restrictive in character, it being understood that only the preferred embodiment has been shown and described and that all changes and modifications that come within the spirit of the invention are desired to be protected.

We claim:

1. A check writing guide for drafting a check when placed in a first orientation relative to said guide or for endorsing a check when placed in a second orientation relative to said guide and transverse to the first orientation, comprising:

(a) a base plate member;

(b) a template member overlaying said base plate member, said template member having:

(i) a first aperture sized and positioned to facilitate writing the date on a check when placed in said first orientation, (ii) a second aperture sized and positioned to facilitate writing the name of the payee on a check when placed in said first orientation, (iii) a third aperture sized and positioned to facilitate writing the amount, in numerals, on a check when placed in said first orientation, (iv) a fourth aperture sized and positioned to facilitate writing the amount, in text, on a check when placed in said first orientation, (v) a fifth aperture sized and positioned to facilitate signing the name of the payor on a check when placed in said first orientation, and (vi) a sixth aperture sized and positioned to facilitate filling out the memo line of a check when placed in said first orientation and to facilitate endorsing a check when placed in said second orientation; and (c) means for positively aligning a memo line area of said check with said sixth aperture when said check is placed in said first orientation and for positively aligning an endorsement area of said check with said seventh aperture when said check is placed in said first orientation.

2. The check writing guide of claim 1 and further including a case member hingedly attached to said base member so that said template member is protected when not in use.

* * * * *

UNITED STATES PATENT AND TRADEMARK OFFICE
CERTIFICATE OF CORRECTION

PATENT NO. : 5,616,032

DATED : April 1, 1997

INVENTOR(S) : John E. Keitzer and Betty J. Keitzer

It is certified that error appears in the above-identified patent and that said Letters Patent is hereby corrected as shown below:

In col. 1, line 12, please change "tile" to --the--.

In col. 1, line 27, please change "wilt" to --with--.

In col. 2, line 17, please change "wilt" to --will--.

In col. 2, line 39, please insert a period after the word "included".

In col. 3, line 5, please change "ark" to --art--.

In col. 3, line 25, please change "sighted" to --signed--.

Signed and Sealed this

Twenty-sixth Day of August, 1997

Attest:

BRUCE LEHMAN

*Attesting Officer*  *Commissioner of Patents and Trademarks*